(12) United States Patent
Imes

(10) Patent No.: US 12,492,084 B2
(45) Date of Patent: Dec. 9, 2025

(54) MULTIPLE MASS FLOW CONVEYOR SYSTEM

(71) Applicant: ILLINOIS TOOL WORKS INC., Glenview, IL (US)

(72) Inventor: Douglas A. Imes, Greer, SC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 119 days.

(21) Appl. No.: 18/413,849

(22) Filed: Jan. 16, 2024

(65) Prior Publication Data
US 2024/0246775 A1     Jul. 25, 2024

Related U.S. Application Data

(60) Provisional application No. 63/440,282, filed on Jan. 20, 2023.

(51) Int. Cl.
| | |
|---|---|
| B65G 47/69 | (2006.01) |
| B65G 47/26 | (2006.01) |
| B65G 47/32 | (2006.01) |
| B65G 47/51 | (2006.01) |
| B65G 47/57 | (2006.01) |

(52) U.S. Cl.
CPC ........... *B65G 47/69* (2013.01); *B65G 47/261* (2013.01); *B65G 47/32* (2013.01); *B65G 47/5109* (2013.01); *B65G 47/57* (2013.01); *B65G 2201/0235* (2013.01); *B65G 2203/041* (2013.01)

(58) Field of Classification Search
None
See application file for complete search history.

(56) References Cited

U.S. PATENT DOCUMENTS

| | | | |
|---|---|---|---|
| 6,612,425 B1 * | 9/2003 | Garvey ................ | B65G 23/36 198/570 |
| 6,959,802 B1 * | 11/2005 | Garvey ............... | B65G 47/684 198/347.4 |
| 6,964,329 B1 * | 11/2005 | DiBianca ............. | B65G 51/03 198/347.1 |
| 7,198,147 B2 * | 4/2007 | Petrovic ............. | B65G 47/682 198/452 |
| 7,252,186 B2 * | 8/2007 | Paquin ................ | B65G 47/682 198/452 |
| 7,322,459 B2 * | 1/2008 | Garvey ............... | B65G 47/684 198/623 |
| 9,382,076 B1 * | 7/2016 | Earling ................ | B65G 47/24 |
| 9,714,144 B2 * | 7/2017 | Earling ............. | B65G 47/5145 |
| 9,845,201 B1 * | 12/2017 | Trinh .................. | G07F 17/0092 |
| 9,856,093 B2 * | 1/2018 | Beesley .............. | B65G 47/682 |
| 9,914,594 B1 * | 3/2018 | Mahar .................. | B65G 47/52 |
| 10,118,773 B2 * | 11/2018 | Mahar .................. | B65G 47/71 |
| 10,538,396 B2 * | 1/2020 | Berger ............... | B65G 47/683 |

* cited by examiner

*Primary Examiner* — Kavel Singh
(74) *Attorney, Agent, or Firm* — Pauley Erickson & Swanson

(57) ABSTRACT

A system for controlling a flow of articles includes two or more conveyor sections driven in a feed direction to convey articles. A plurality of sensors, each sensor associated with a conveyor section, count the articles in each lane. An accumulator conveyor is associated with a conveyor section and runs in an opposite direction to permit accumulation.

13 Claims, 2 Drawing Sheets

MULTIPLE MASS FLOW CONVEYOR SYSTEM

CROSS REFERENCE TO RELATED APPLICATION

This application claims the benefit of U.S. Provisional Application, Ser. No. 63/440,282, filed on 20 Jan. 2023. The provisional application is hereby incorporated by reference herein in its entirety and is made a part hereof, including but not limited to those portions which specifically appear hereinafter.

BACKGROUND OF THE INVENTION

Field of the Invention

This invention relates generally to conveyor systems, and more particularly, to a flow equalizer for conveyor systems.

Description of Prior Art

Current conveyor systems use a variety of systems and processes to more smoothly and efficiently convey items, especially between packaging. While conveyors can be used to process a wide variety of items, certain items such as bottles, cans, cartons, etc. are desirably conveyed in predictable volumes for better organization, efficiency, and packing after such items leave the conveyor.

Accumulators may be used which accommodate excess container volume to permit an outflow to equal an inflow when downstream operations are slowed or stopped.

However, even with such systems, the flow of articles may be uneven or unpredictable. Therefore, improvements are desired to balance the flow of articles through a conveyor system. The claimed invention provides such an improvement by controlling the flow rate of articles on a conveyor system.

SUMMARY OF THE INVENTION

The invention generally relates to a series of conveyors and sensors for monitoring and adjusting flow rates of articles on a conveyor system. The general object of the invention can be attained, at least in part, through a system for controlling a flow of articles. The system includes a conveyor section driven in a direction to convey articles in the direction and a connected sensor. A preferred system includes multiple conveyor sections and multiple associate sensors. A plurality of sensors are included for counting the articles on each respective conveyor section. The flow rates are based on a count of articles in a respective conveyor section of the two or more conveyor sections.

The resulting system provides first in/first out, pressureless accumulation where the infeed and outfeed conveyors of the system can run at variable speeds with the difference between these speeds resulting in accumulation or deaccumulation of the system. Such functionality is preferably accomplished using mass conveyors coupled with vision sensors.

Other objects and advantages will be apparent to those skilled in the art from the following detailed description taken in conjunction with the appended claims and drawings.

DETAILED DESCRIPTION OF THE INVENTION

The present invention provides a container flow equalizer for use on a conveyor system. The invention includes a system for controlling a flow of articles as articles are conveyed and processed through a conveyor system. The invention also includes a method for controlling the flow of articles.

Figure 1:
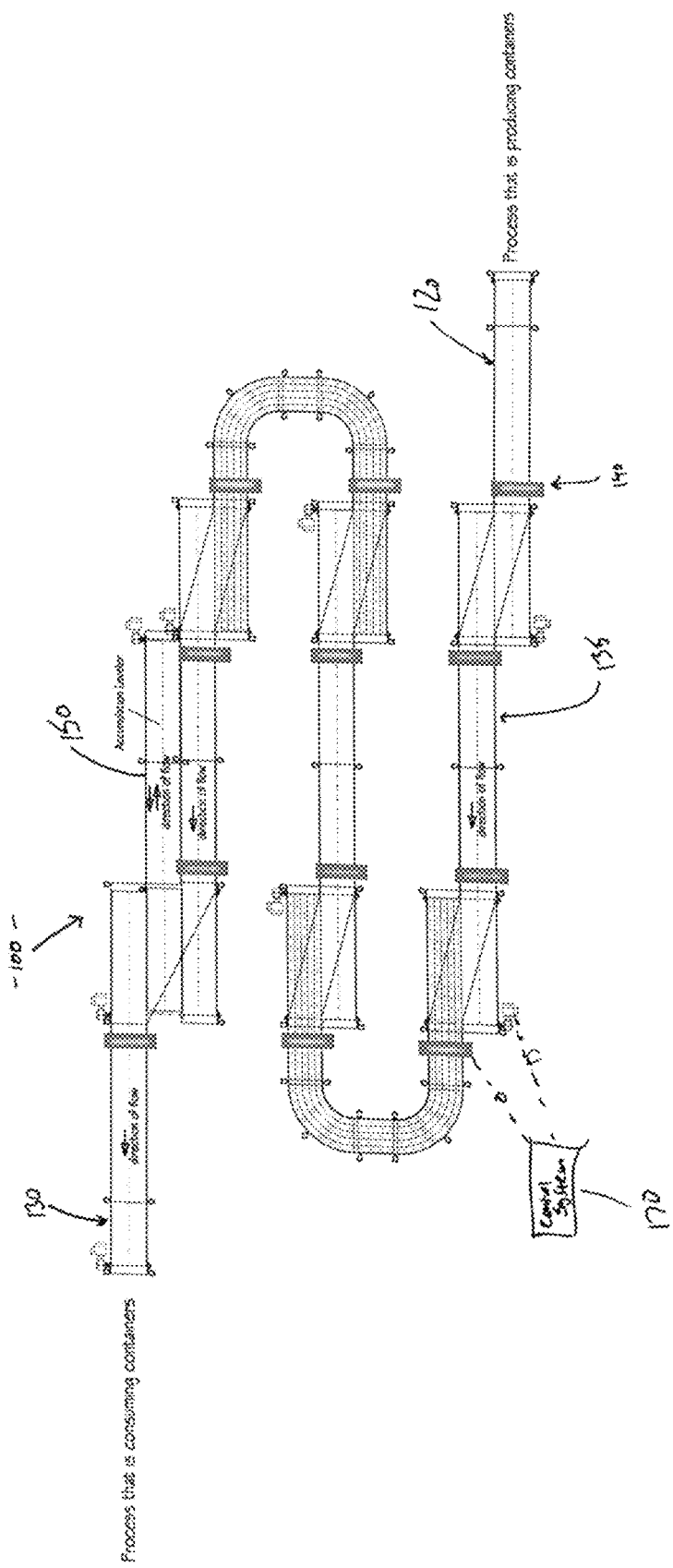
FIG. 1 shows a schematic plan view of a system for controlling a flow rate of articles according to one embodiment of the invention.
Figure 2:
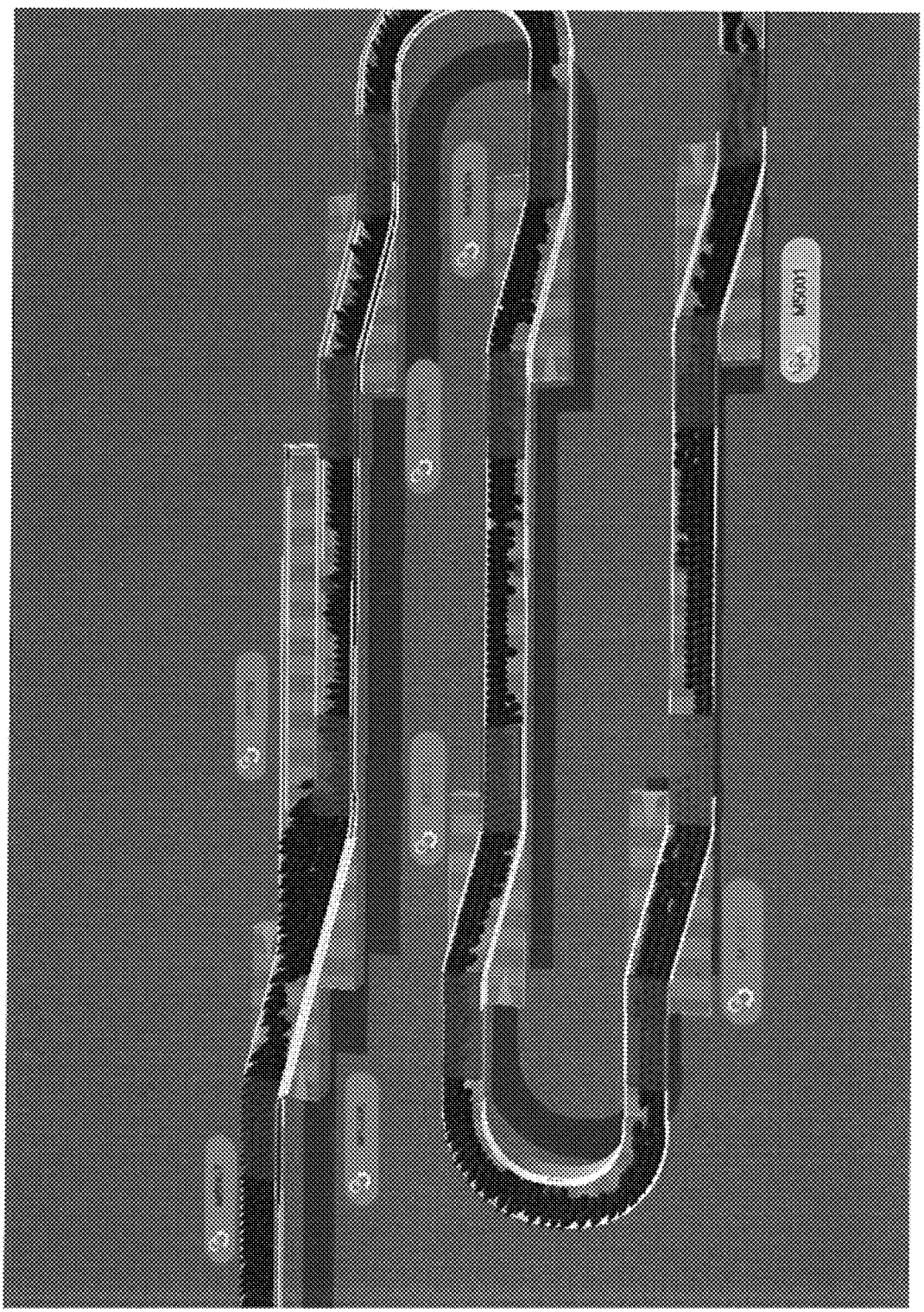
FIG. 2 shows a schematic plan view of a system for controlling a flow rate of articles according to one embodiment of the invention, populated with representations of articles being conveyed to aid in understanding the flow of articles.

FIG. 1 shows a system 100 for controlling a flow of articles. The system 100 is incorporated into two or more conveyor sections with at least an infeed conveyor section 120 and an outfeed conveyor section 130. In a preferred embodiment, the infeed conveyor speed is independent of the outfeed conveyor speed. The infeed conveyor section 120 comprises an inlet of the system and provides a flow of articles to the system 100. The outfeed conveyor section 130 comprises an outlet of the system and provides articles to a downstream operation. In addition, at least one intermediate conveyor section 135 is positioned between the infeed conveyor section 120 and the outfeed conveyor section 130 for conveying articles in the feed direction. As shown in the figures, the conveyor sections 120, 130, 135 together may be formed in a serpentine arrangement to minimize footprint of the system on the factory floor.

Articles can be placed on the two or more conveyor sections 120, 130, 135 for conveyance from an upstream infeed conveyor 120 optionally through additional intermediate conveyor sections 135 and on to the outfeed conveyor 130 for conveyance to the downstream operation. The downstream operation may include fillers, labelers, cartoners, case packers, palletizers and/or other devices and/or operations.

On at least one portion of each conveyor section, a sensor 140 is placed adjacent to the conveyor section. In a preferred embodiment, the sensor 140 is placed at an outlet end of each conveyor section. The sensor 140 preferably comprises a camera or similar vision sensor capable of counting the articles traveling through each conveyor section to determine an article density. The sensor 140 may count the articles as an input that can be sent to a controller to detect any imbalance between the counts of each successive conveyor section $135^{x+1}$ and associated sensor $140^{x+1}$. Each sensor 140 preferably counts a segment of the articles within a defined count box 145. More particularly, each the sensors 140 determines a density of articles within the count box 140 of the respective conveyor section 120, 130, 135. It is desirable in the present conveying system to maintain a precise numeric or density balance among lanes to keep the conveyor running smoothly.

An accumulator leveler conveyor 150 is preferably associated with the last section 135, prior to the section 130. The accumulator conveyor 150 is positioned parallel to conveyor section 135 and is configured to operate in a direction opposite the feed direction while accumulating, and in the same direction as the feed conveyor when de-accumulating. As such, the accumulator conveyor 150 runs in reverse of the feed direction directly parallel to one associated conveyor section 120, 130, 135 to permit articles to accumulate as the conveyor moves backward relative to flow until article density among the conveyor sections 120, 130, 135 is restored to a desired density.

A control system 170 is preferably connected with respect to the plurality of sensors 140 and the plurality of conveyor sections 120, 130, 135. The control system 170 is used for controlling the speed of each conveyor section 120, 130, 135 based on a count of each associated sensor 140. The control system 170 preferably controls the speed of each conveyor section 120, 130, 135 to a common speed based on article count in each conveyor section 120, 130, 135. As described above, the associated sensor 140 of each conveyor section determines a density of articles on each adjacent conveyor section which is then compared to control the speed of each conveyor section 120, 130, 135.

An associated method for controlling a flow of articles comprises providing a flow of articles to an infeed conveyor section in a feed direction; flowing the articles through at least one intermediate conveyor section in the feed direction; providing the flow of articles to an outfeed conveyor section in the feed direction and to a downstream operation; associating an accumulator leveler conveyor with one conveyor section, the accumulator leveler conveyor positioned parallel to the one associated conveyor section and operating in a direction opposite the feed direction while the system 100 is accumulating, and in the same direction as the feed conveyor while de-accumulating; measuring an article count in each conveyor section with a plurality of sensors, each sensor of the plurality associated with one conveyor section; and adjusting a speed of each adjacent conveyor section based upon an article count within the adjacent conveyor sections with a control system connected with respect to the plurality of sensors and the plurality of conveyor sections.

The method may further include determining a base flow rate of the articles with the associated sensor. Based on this base flow rate, the flow rate of the articles may be adjusted to match the base flow rate.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A system for controlling a flow of articles using a plurality of conveyor sections, the system comprising:
    an infeed conveyor section providing a plurality of articles to the system, the infeed conveyor section conveying articles in a feed direction;
    at least one intermediate conveyor section conveying articles in the feed direction;
    an outfeed conveyor section providing the plurality of articles in the feed direction to a downstream operation;
    an accumulator leveler conveyor associated with a last intermediate conveyor section prior to the outfeed conveyor section, the accumulator leveler conveyor positioned parallel to one associated conveyor section and configured to operate in directions both opposite the feed direction, and the same as the feed direction, depending on whether the system is accumulating or deaccumulating;
    a plurality of sensors, each sensor of the plurality of sensors associated with one conveyor section, each sensor for counting a segment of the articles in each conveyor section; and
    a control system connected with respect to the plurality of sensors and the plurality of conveyor sections, the control system controlling a speed of each conveyor section based on a count of each associated sensor.

2. The system for controlling a flow of articles according to claim 1 wherein each sensor counts a segment of the articles within a defined count box.

3. The system for controlling a flow of articles according to claim 1, wherein the control system controls the speed of each conveyor section to a common article density based on article count in each conveyor section.

4. The system for controlling a flow of articles according to claim 1, wherein the sensors determine a density of articles within the conveyor section.

5. The system of claim 1 wherein a plurality of intermediate conveyor sections are arranged in a serpentine pattern.

6. The system of claim 1 wherein each sensor comprises a camera.

7. The system of claim 1 wherein a density of articles on each adjacent conveyor is determined and compared to control the speed of each conveyor section.

8. The system of claim 1 wherein the infeed conveyor of an overall system speed is independent of the outfeed conveyor speed of the overall system.

9. A method for controlling a flow of articles, comprising:
    providing a flow of articles to an infeed conveyor section in a feed direction;
    flowing the articles through at least one intermediate conveyor section in the feed direction;
    providing the flow of articles to an outfeed conveyor section in the feed direction and to a downstream operation;
    associating an accumulator conveyor with one conveyor section, the accumulator conveyor positioned parallel to the one associated conveyor section and operating in a direction opposite the feed direction;
    measuring an article count in each conveyor section with a plurality of sensors, each sensor of the plurality associated with one conveyor section; and
    adjusting a speed of each adjacent conveyor section based upon an article count within the adjacent conveyor sections with a control system connected with respect to the plurality of sensors and the plurality of conveyor sections.

10. The method for controlling a flow of articles according to claim 9, further comprising determining a base flow rate of the articles with the associated sensor.

11. The method for controlling a flow of articles according to claim 10, further comprising adjusting the flow rate of the articles to match the base flow rate.

12. The method for controlling a flow of articles according to claim 9, further comprising determining a density of articles within the conveyor section with the associated sensor.

13. The method for controlling a flow of articles of claim 9, further comprising comparing a density of articles on each adjacent conveyor to control the speed of each conveyor section.

* * * * *